United States Patent [19]

Zabonick

[11] 4,132,301

[45] Jan. 2, 1979

[54] FLUID ACTUATABLE FAN CLUTCH WITH INTERNAL CALIPER ACTION

[75] Inventor: Jerry L. Zabonick, Coldwater, Mich.

[73] Assignee: Evans Products Company, Portland, Oreg.

[21] Appl. No.: 779,591

[22] Filed: Mar. 21, 1977

[51] Int. Cl.$^2$ .......................................... F16D 25/00
[52] U.S. Cl. ............................. 192/85 AA; 192/110 B; 416/169 A
[58] Field of Search ............. 192/82 T, 85 AA, 91 A; 416/39, 169 A

[56] References Cited

U.S. PATENT DOCUMENTS

| | | | |
|---|---|---|---|
| 2,511,520 | 6/1950 | Walton | 192/85 AA |
| 2,637,308 | 5/1953 | Dodge | 192/82 T |
| 2,661,148 | 12/1953 | Englander | 416/39 X |
| 2,927,563 | 3/1960 | Geiger | 192/85 AA X |

FOREIGN PATENT DOCUMENTS 881130  11/1961  United Kingdom ............... 192/85 AA Primary Examiner—Benjamin W. Wyche
Attorney, Agent, or Firm—Robert E. Howard

[57] ABSTRACT

A fluid actuatable fan clutch having an energy absorbing internal caliper action, including a pulley or sheave rotatably mounted on a fixed shaft; an annular friction facing connected to an internal surface of the sheave; a fan blade hub rotatably mounted on the shaft adjacent the sheave, the hub having an annular piston cavity or cylinder having a piston located therein facing the friction facing, the piston being normally urged out of contact with the friction facing by a suitable spring member; an annular thrust cap located on the side of said friction facing opposite the piston, the thrust cap being connected to the fan hub and being normally out of contact with the friction facing; and suitable passageways for supplying air or other fluid to the back side of said piston for urging the piston into contact with said friction facing and against said thrust cap to thereby engage the fan hub with the sheave. The fan clutch also has a removable fan hub cap for permitting access to the airseal located at the outer end of the shaft to thereby permit easy replacement thereof. The fan clutch is further provided with a safety retaining ring located on the shaft to prevent the fan hub and connected parts from being thrust outwardly off the shaft in the event of a clutch failure.

3 Claims, 1 Drawing Figure

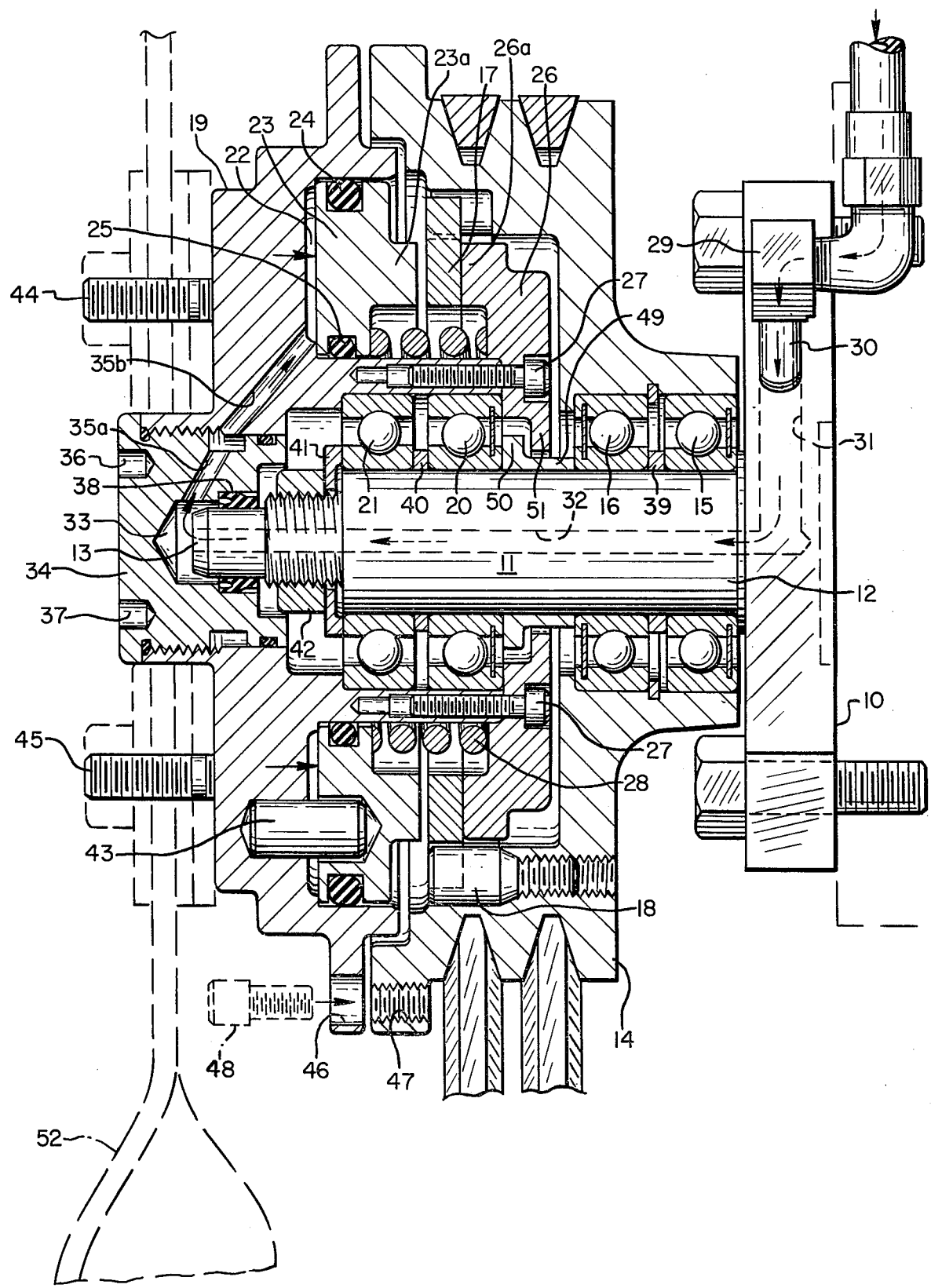

FLUID ACTUATABLE FAN CLUTCH WITH INTERNAL CALIPER ACTION

BACKGROUND OF THE INVENTION

Fluid actuatable fan clutches are used in conjunction with internal combustion engines, and more particularly diesel engines, in heavy duty vehicles to provide a cooling action when the engine is in an overheated condition. Air or other fluid is supplied to the fan clutch to actuate it in response to a thermally actuatable air valve, such as the one described in U.S. Pat. No. 3,955,760.

One such fluid-operated clutch mechanism is described in U.S. Pat. No. 3,253,687 in which a friction facing material is attached to a sheave rotatably mounted on a shaft, a hub portion is mounted on said shaft adjacent said sheave, and the hub has an internal, annular piston which can be urged into contact with the friction facing by air or other fluid pressure. However, in devices of this type, the outward thrust created by the piston being urged into contact with the friction facing material places a large load on the bearings which can lead to early failure.

U.S. Pat. No. 3,762,517 discloses a fluid-operated fan clutch which employs internal dual pistons acting in opposite directions. However, this concept requires a fairly complicated mechanical device and also still retains an outwardly thrusting reaction during actuation of the device.

A fan clutch is described in a bulletin numbered 20-0612 of the Schwitzer division of Wallace-Murray Corporation, Box 80-B, Indianapolis, Ind. in which a drive disk is engaged with the hub of a fan clutch by a squeezing action between a piston located in the hub and a plate attached to the hub. However, in this device the piston, drive disk and back-up plate are located on the external circumference of the hub, and the back-up plate is connected to the hub on the outer circumference thereof, which said construction still provides a considerable thrusting leverage.

It is an object of the present invention, therefore, to provide a fluid actuatable fan clutch in which there are substantially no outwardly acting thrusting forces acting on the bearings.

SUMMARY OF THE INVENTION

The present invention is a fluid actuatable fan clutch having an energy absorbing internal caliper action. The fan clutch includes a sheave rotatably mounted upon the inner end of a fixed shaft, and a fan hub rotatably mounted upon the outer end of the shaft. The sheave has an annular friction facing connected to an internal surface thereof. The hub has an annular piston cavity of cylinder having a piston located therein, the front face of the piston facing the friction facing connected to the sheave. A thrust cap is located behind the friction facing and connected to the fan hub. A spring member urges the piston out of engagement with the friction facing in a non-actuated mode. Suitable air passageways are provided to supply air to the backside of the piston. During an actuated mode, air is supplied to the backside of the piston and urges it into contact with the friction facing and against the thrust cap, thereby engaging the fan hub with the sheave.

The clutch is provided with a removable cap connected to the fan hub on the outer end of the shaft. The removable cap permits easy access to the airseal located at the outer end of the shaft thereby permitting its easy replacement in the event of failure.

A safety retaining ring is located on the shaft in a position to restrain the fan hub from being thrust outwardly off the shaft in the event of clutch failure.

Reference is made to the drawing for an understanding of the preferred embodiments of the present invention.

DESCRIPTION OF PREFERRED EMBODIMENT

In the drawing the fluid actuatable fan clutch of the present invention is provided with a mounting bracket assembly 10 which is adapted to be attached to the engine block of an internal combustion engine. A shaft 11 is secured to mounting bracket assembly 10 such as by welding. Shaft 11 has an inner end 12 and an outer end 13.

Sheave 14 is rotatably mounted at the inner end 12 of shaft 11 by means of sheave bearings 15 and 16. An annular friction facing 17 is affixed to an inner surface of sheave 14 by means of a number of friction facing drive pins 18, only one of which is illustrated. Friction facing 17 is free to slip back and forth upon drive pins 18. As can be seen from the drawing, at least an annular portion on both faces of said annular friction facing 17 is exposed.

Fan hub 19 is rotatably mounted upon shaft 11 at the outer end thereof by means of fan hub bearings 20 and 21. An annular piston cavity or cylinder 22 located on the inner face of fan hub 19 contains an annular piston member 23 having an annular extension portion 23a facing, and in alignment with friction facing 17. O-rings 24 and 25 form a fluid-tight seal between piston 23 and piston cavity 22.

A circular thrust cap 26 having an annular anvil portion 26a is located on the side of friction facing 17 opposite to that side of the friction facing directed toward piston 23. Thrust cap 26 is connected to hub 19 by thrust cap connecting pin members 27, only two of which are illustrated. it is one of the features of the present invention to locate the thrust cap connecting pins 27 in a position between the outer races of fan hub bearings 20 and 21 and the friction facing 17, and closely adjacent to the bearings, to thereby substantially eliminate any thrusting action on the fan hub bearings and reduce any adverse thrusting action between the hub and thrust cap.

Spring member 28 is located between thrust cap 26 and piston 23 and normally urges piston 23 out of contact with friction facing 17.

Air or other fluid is introduced to the fan clutch via port 29 of stem 30, passes through a passageway 31 of bracket assembly 10, through an axial passageway 32 located in shaft 11, into chamber 33 located in cap 34, and from chamber 33 into piston cavity 22 via passageways 35a and 35b.

Cap member 34 is threadably secured to hub 19, and can be inserted or removed by using a two-pronged tool, the prongs of which fit into slots 36 and 37. A rotary fluid seal 38 is provided between the outer end 13 of shaft 11 and cap 34.

The races of bearings 15 and 16 are spaced apart by spacer member 39 and the races of bearings 20 and 21 are spaced apart by spacer member 40. Bearings 15, 16, 20 and 21 are further held in place by collar members located on adjacent parts as illustrated, the inner races of the bearings being press fit onto shaft 11. The bearings are further held in place on shaft 11 by spacer member 41 located on the collar portion existing between the larger diameter main body portion of shaft 11 and a smaller diameter outer portion 13 of shaft 11. Spacer member 41 is held in place by a suitable fastening member 42, such as a nut.

Suitable drive pin members 43, only one of which is illustrated, are securely fastened in fan hub 19 and slidably inserted into sockets located in piston 23. Hub drive pin members 43 transmit the motion of the piston to the hub in a manner to be subsequently described.

Suitable studs 44 and 45 (as well as any required number of others which are not illustrated) are affixed to the front face of fan hub 19 for fastening a suitable fan blade 52 to the hub.

An opening 46 in fan hub 19 and an opening 47 in sheave 14 is provided for use in an emergency when, for one reason or another, the clutch may fail to operate whereby a suitable fastening member 48 may be inserted therethrough for locking the sheave 14 to the hub 19.

The operation of the fan clutch of the present invention will now be described.

In normal operation, the parts are substantially as shown in the drawing. In this position (and with the clutch mounted on a suitable internal combustion engine with fan blades 52 attached to the fan hub 19 by means of studs 44 and 45) the sheave 14 is connected to the engine by suitable pulley belts to drive the sheave. In the mode illustrated, the sheave rotates about shaft 11 along with attached friction facing 17. Friction facing 17, which is free to slip back and forth on drive pins 18, rides free in the space between piston 23 and thrust cap 26, and transmits no motion thereto. Spring member 28 pushes outwardly against piston 23 so that piston 23 does not contact the friction facing 17 and the motion of sheave 14 is not imparted to fan hub 19.

Upon the engine reaching a temperature which requires the operation of the fan for cooling purposes, a thermostatically controlled fluid valve (such as the one illustrated in U.S. Pat. No. 3,955,760) is actuated and passes compressed air or other fluid from a suitable source through a suitable conduit (not illustrated) to port 29 of stem 30. The fluid passes through stem 30, bracket passageway 31, axial passageway 32 located in shaft 11, out the outer end 13 of shaft 11 into chamber 33 located in cap 34, through passageways 35a and 35b to piston cavity 22 located in fan hub 19. Pressure is then exerted by the fluid against the backside of piston 23 urging it forward against the action of spring member 28 and into contact with one exposed face of said friction facing 17. The fluid pressure exerted is sufficient to cause the friction facing 17 to be squeezed between piston 23 and thrust cap 26 whereby the other exposed face of friction facing 17 contacts the anvil portion 26a of thrust cap 26. The motion of sheave 14 is then transmitted to friction facing 17 by drive pins 18 and thence to piston 23 which, in turn, imparts its rotary motion to fan hub 19 via drive pins 43. In full engagement, the fan hub 19 rotates at the same speed as sheave 14 and thus turns the fan blades attached to the fan hub 19 by means of studs 44 and 45.

Upon the engine being cooled to a sufficient degree, the thermostatically controlled air valve (not shown) shuts off the flow of air or another fluid to the fan clutch, and communicates the piston cavity with the atmosphere. As the fluid is exhausted, the action of spring member 28 again urges piston 23 out of contact with friction facing 17 and thereby disengages the fan hub 19 from contact with sheave 14. The fan hub 19 gradually slows down and eventually substantially stops.

An additional feature of the present invention is in the provision of a safety retaining ring 49. Safety retaining ring 49 is press fit onto shaft 11, and has an outwardly extending collar portion 50. Outwardly extending collar portion 50 and a collar portion 51 located on thrust cap 26 overlap, as illustrated. In the event the clutch were to fail and outwardly thrusting forces were imposed upon fan hub 19 and thrust cap 26 tending to move these elements in an outwardly direction off shaft 11, safety retaining ring 49 would prevent these elements from slipping off shaft 11 by virtue of collar portion 50 of safety retaining ring 49 coming into contact with collar portion 51 of thrust cap 26.

In the event that rotary seal 38 requires replacing, this may be easily accomplished in the device of the present invention by inserting a pronged tool into slots 36 and 37 of cap 34 and unscrewing the cap from fan hub 19.

By employing an energy absorbing caliper action; i.e., the squeezing action between piston 23 and thrust cap 26 upon friction facing 17, the clamping pressure of approximately 2000 psi produced by the piston is absorbed within the hub assembly itself, and not by the bearings. This caliper design utilizes both sides of the friction facing which allows a greater friction area within a smaller volume. By tying in the thrust cap to the fan hub by means of pins 27 at a location between the outer races of bearings 20 and 21, and the zone of contact between piston 23, friction facing 17 and thrust cap 26, and closely adjacent thereto, little or no leverage action is exerted between the piston and the thrust cap.

Having thus described the preferred embodiments of the invention, what is claimed as new is:

1. In a fluid-actuatable fan clutch having a sheave and a fan hub rotatably mounted upon a fixed shaft by means of sheave bearings and fan hub bearings, respectively, said sheave being adapted to be driven from a power source, and clutch means for drivingly connecting said sheave to said fan hub, said clutch means including an annular piston means in engageable relationship with an exposed face of an annular friction facing connected to an internal surface of said sheave in a manner such that at least an annular portion of both faces of said friction facing is exposed, the improvement comprising locating the cavity containing said piston in the face of said fan hub directed toward said sheave, locating a thrust cap in engageable relationship with the other exposed face of said annular friction facing and in alignment with said piston, and connecting said thrust cap to said fan hub by connecting means located between that portion of said thrust cap in alignment with said piston and said shaft and closely adjacent said fan hub bearings whereby, upon actuation of said piston into engagement with said friction facing and the engagement of said friction facing with said thrust cap, thrust forces upon said fan hub bearings are substantially eliminated.

2. The fan clutch of claim 1 wherein said fan hub has a removable cap in its axial central portion to provide access to a rotary seal member located at the outer end of said shaft.

3. The fan clutch of claim 1 wherein a safety retaining ring is fixed on said shaft outwardly of said thrust cap, said ring having an outwardly extending collar portion which overlaps with a downardly extending collar portion on said thrust cap to prevent said fan hub from being thrust outwardly off said shaft.

* * * * *